United States Patent Office 3,723,355
Patented Mar. 27, 1973

3,723,355
ELASTOMERIC MIXTURES VULCANIZABLE TO ELECTRICALLY CONDUCTIVE VULCANISATES AND METHODS OF PREPARING THE SAME
Johannes Jacobus and Cornelis Schats, Bussum, and Hendrik Schenk, Santpoort, Netherlands, assignors to Koninklijke Zwavelzuurfabrieken Voorheen Ketjen N.V., Amsterdam, Netherlands
No Drawing. Filed Sept. 30, 1970, Ser. No. 76,984
Claims priority, application Netherlands, Oct. 3, 1969, 6914953
Int. Cl. H01b 1/06; C01b 31/00; C08h 17/08
U.S. Cl. 252—511                          20 Claims

ABSTRACT OF THE DISCLOSURE

Electrically conductive vulcanisates having desirable mechanical properties are obtained by vulcanization of elastomeric mixtures containing for each 100 parts, by weight, of elastomer, approximately 40 to 400 parts, by weight, of non-conductive filler which may have reinforcing or non-reinforcing properties, and approximately 2 to 15 parts, by weight, of gasification carbon, that is, the carbon obtained as a by-product in the preparation of a gas mixture containing carbon monoxide and hydrogen by the gasification of hydrocarbons with oxygen-containing gases at high temperature.

---

This invention relates generally to electrically conductive vulcanised elastomeric compounds and to the preparation thereof.

Elastomeric polymers and copolymers used by the rubber industry have a volume resistivity varying from $10^{13}$ to $10^{16}$ ohm. cm. For many uses, however, after the elastomer has been processed, the end product or vulcanisate must have antistatic or even conductive properties.

It is impossible to state exactly the resistance values at which rubber compounds are antistatic or electrically conductive, as such values depend among other things, such as external factors, upon the method of determining the resistivity. Qualitatively, it can be stated that a rubber compound is antistatic if it can discharge electrostatic charges at the same speed as such charges are generated, so that at no point do charges occur which might result in an explosion in the presence of readily flammable materials. Generally speaking, a rubber or elastomeric compound is antistatic if its volume resistivity is between $10^4$ and $10^8$ ohm. cm. and rubber or elastomeric compounds having a volume resistivity of less than $10^4$ ohm. cm. are electrically conductive.

The resistivity of a rubber or elastomeric compound is determined mainly by (1) the polymer or polymers from which the compound is made, (2) the filler and (3) the filler concentration in the compound.

The influence of the polymer can be illustrated by the difference in volume resistivity between a natural rubber compound and a styrene butadiene rubber compound. A natural rubber compound filled with 50 parts by weight of SRF black—a non-conductive furnace black—per 100 parts by weight of elastomer, has a volume resistivity of about $5.10^6$ ohm. cm., while the volume resistivity of a styrene butadiene rubber compound filled with the same amount of SRF black is greater than $10^{12}$ ohm. cm.

Known electrically conductive fillers are acetylene black and furnace black having a small particle size, such as CF, SAF and ISAF black. An elastomer filled with 50 parts by weight of such electrically conductive black per 100 parts by weight of elastomer has a volume resistivity of the order of 10 ohm. cm., in the case of natural rubber, and $10^2$ ohm. cm., in the case of styrene butadiene rubber.

The influence of the type of filler and the filler concentration on the conductivity of filled rubber compounds is described in R. H. Norman, "Conductive Rubber," 2nd Edition, 1959 (MacLaren & Sons Ltd. London), Chapter 3.

It has been found that, although the incorporation of known electrically conductive fillers in elastomeric compounds yields compounds which are electrically conductive, the resulting elastomeric compounds have high moduli as a result of the nature of these fillers. The manufacture of elastomeric compounds having low moduli is impossible with the known electrically conductive fillers. The fillers which yield elastomeric compounds having a low modulus impart to said compounds insulating properties. Modification of the mechanical properties of electrically conductive elastomeric compounds by the incorporation of other fillers in addition to the electrically conductive blacks results in a considerable reduction of conductivity. In addition, in such cases, the extrusion properties of the unvulcanised compound deteriorate, and this is a disadvantage for many uses. Consequently, there have been only very limited possibilities of varying specific mechanical properties in the required way by varying the composition of electrically conductive elastomeric compounds.

It is an object of this invention to provide electrically conductive elastomeric compounds having low moduli and other desirable mechanical properties both before and after the vulcanizing thereof.

In accordance with an aspect of this invention, electrically conductive elastomeric compounds having low moduli are obtained by incorporating therein relatively small amounts of gasification carbon in addition to the conventional non-conductive fillers.

The term "gasification carbon," as used in this specification and the appended claims, denotes the carbon arising as a by-product in the gasification processes known in the art for the preparation of CO and $H_2$ containing gas mixtures, that is, so-called "synthesis gas," from hydrocarbons by the gasification of the latter with oxygen-containing gases at high temperatures. Known gasification processes are the Shell gasification process and the Texaco gasification process. These processes are described, for example, in Hydrocarbon Processing, volume 46, No. 11 (The 1967 Petrochemical Handbook Issue), November 1967, page 227 (as to the Shell gasification process) and in Industrial and Engineering Chemistry, volume 48, No. 7, pages 1118–1122 (as the the Texaco gasification process), and also in British patent specifications 649645, 703721, 734475, 755946 and 780120, and U.S. Pat. Nos. 2,582,938; 2,665,980 and 2,914,418. A comparative study of some of the known gasification processes will be found in "Advances in Petroleum Chemistry and Refining," volume 10, Chapter 4, pages 123–189 (Interscience Publishers, New York, 1965).

The carbon prepared by these known processes is generally referred to as gasification carbon and has a surface, determined by the BET method, of 300–1500 m.$^2$/g., a micropore volume ($N_2$ method) of 1.0–3.0 ml./g., a macropore volume (Hg-porosimeter) of 2.0–4.0 ml./g., an oil absorption of 2.5–5.5 ml./g. a volatile substance content of 0.1–6.0% by weight and an ash content of 0.5–10.0% by weight.

U.S. Pat. No. 2,914,418 discloses that the carbon obtained by the gasification process described therein is useful in those applications where a high modulus reinforcing black or a conductive black is required. However, it has been found that the use of gasification carbon alone as a rubber filler has many disadvantages. Although an elastomeric compound containing gasification carbon as a filler has a high electrical conductivity, the mechanical properties of the end product are in most cases practically unacceptable. More particularly, the high plasticity, considerable hardness, high modulus and high internal heat evolution on repeated bending or flexing that result from the use of gasification carbon as the filler make the end product unsuitable for most uses. These unacceptable properties occur with a filler concentration of as little as 20 parts by weight of gasification carbon per 100 parts by weight of elastomer.

Surprisingly, it has now been found that elastomeric compounds with excellent antistatic or electrically conductive properties and desired mechanical properties can be prepared by adding 2–15 parts, by weight, of gasification carbon for each 100 parts, by weight of an elastomer in addition to a conventional quantity of non-conductive filler. The conventional quantity of non-conductive filler generally varies between 40 and 400 parts by weight per 100 parts by weight of elastomer.

The non-conductive filler used may be either a reinforcing filler or a non-reinforcing filler. Examples of reinforcing fillers are certain furnace blacks, such as SRF and APF black, and certain forms of silica. Examples of semi-reinforcing or non-reinforcing fillers are chalk, calcium silicate and certain types of clay.

In accordance with the invention it is possible to prepare antistatic or electrically conductive elastomeric compounds having different mechanical properties determined primarily by the choice of the non-conductive filler used in combination with the gasification carbon.

In gasification processes, the gasification carbon is generally separated from the gas mixture or synthesis gas by means of cyclones or a water curtain. In the latter case, the carbon is obtained from the aqueous slurry, and various processes are known in the art for this purpose. For example, the carbon is recovered by means of a water-immiscible auxiliary liquid, such as a mineral oil, heptane or toluene, and the carbon is frequently obtained in granular form. Processes of this kind are described, for example, in British patent specification 741,135 and laid-open Dutch application 271,293. In accordance with the present invention, the gasification carbon may be incorporated in the elastomeric compound in either powder form or in non-dust-forming granular form. Preferably, the carbon is used in the granular form, as the carbon is then readily dispersible in the elastomeric mixture.

In some cases it may be advantageous to initially mix the gasification carbon with the other filler and then to mix the resulting mixture into the elastomer. This improves the dispersion speed. In the case of elastomeric compounds which are difficult to process, for example, compounds containing butyl rubber, the dispersion of the gasification carbon can be facilitated by first mixing the carbon with substantially equal parts, by weight, of a plasticiser which is to be incorporated in the elastomeric compound. If the gasification carbon is in granular form, this pre-mixing operation can be controlled so that the granular form is maintained. The gasification carbon can also be used in a form in which it is granulated with oil.

Another advantage of this invention is that it results in elastomeric compounds or mixtures having greatly improved extrusion properties. The extrusion speed and extrusion capacity of the unvulcanised compounds or mixtures prepared according to the invention appear to be much greater than those of compounds in which no gasification carbon has been added or in which gasification carbon is replaced by equal parts by weight of another electrically conductive carbon, such as, acetylene black. After extrusion, the swelling of elastomeric compounds prepared according to the invention is reduced. There is also a significant improvement in resistance to abrasion.

In the gasification processes in which the carbon used according to this invention occurs as a byproduct, the metals present in the raw material are found for the most part in the gasification carbon. It is known that the presence of small quantities of metals in a rubber or elastomeric compound may result in a reduction of its resistance to ageing. Therefore, if required, the metal content of the gasification carbon may be reduced by methods conventional in the art prior to its incorporation in the elastomeric compound. When the gasification carbon is obtained from an aqueous slurry, as when the carbon is separated from the gas mixture by means of a water curtain, the metal content of the gasification carbon is generally so reduced that there are no harmful effects thereof on the elastomeric compound.

The invention will further be described with reference to the following illustrative examples.

In these examples, a gasification carbon was used having the following properties:

B.E.T. surface: 960 m.$^2$/g.
Oil absorption: 3.25 ml./g. (dibutylphthalate)
Volatile substance content: 1.2%
Ash content: 0.7%

The gasification carbon with the above properties was produced, as a by-product, during the production of synthesis gas, that is, gas mixtures of CO and $H_2$, by the gasification process. In such gasification process, a feedstock of heavy fuel oil oxygen and steam were preheated to 240° C. before being introduced to the reactor operating at a pressure of 32 atm. The heavy fuel oil oxygen and steam were introduced into the reactor at flow rates of 4.2 kg./hr., 3.1 Nm.$^2$/hr. and 1.7 kg./hr., respectively. The gaseous product of the process contained 0.3 volume percent methane, and the gasification carbon was produced in a yield of 0.03 kg. thereof per kg. of the feedstock or heavy fuel oil.

Example 1

Five natural rubber mixes (a)–(e), the compositions of which are given in parts by weight in Table A, were prepared in a closed "Banbury" mixer.

TABLE A

| Mix | (a) | (b) | (c) | (d) | (e) |
|---|---|---|---|---|---|
| NR-SS No. 1 | 100 | 100 | 100 | 100 | 100 |
| ZnO | 5 | 5 | 5 | 5 | 5 |
| Stearic acid | 3 | 3 | 3 | 3 | 3 |
| KETJENBLACK SRF-WP | 50 | 45 | 45 | 45 | 40 |
| Gasification carbon | | 5 | | | 10 |
| Acetylene black (Shawinigan) | | | 5 | | |
| Vulcan XC 72 (Cabot) | | | | 5 | |

NOTE.—NR-SS No. 1 is a commercial product (natural rubber "Smoked Sheet No. 1"). KETJENBLACK SRF-WP is a commercially available non-conductive black made by Ketjen Carbon N.V., The Netherlands. VULCAN XC 72 is a commercially available black made by Cabot Corporation and having good electrical conductivity.

Each mix contained a total of 50 parts, by weight, of black filler per 100 parts, by weight, of rubber. In the case of mixes b and e in comparison with mix a, 5 and 10 parts by weight, of the non-conductive KETJENBLACK SRF respectively were replaced by 5 and 10 parts, by weight, of gasification carbon. In mixes c and d in comparison with mix b, 5 parts by weight of the non-conductive KETJENBLACK SRF were replaced by equal parts by weight of another black, having good electrical conductivity.

0.6 part, by weight, of MBTS (bis-2-benzothiazolyldisulphide) and 2.5 parts, by weight, of sulphur were mixed into each of the five mixes (a)–(e) on an open "Troester" mixing roll. The resulting mixes were vulcanised at 145° C. for 30 minutes. The mechanical properties of the vulcanisates were determined by the standard procedures conventional in rubber technology. The Mooney viscosity, Mooney scorch and extrusion characteristics were determined in respect to the unvulcanised mix. The volume resistivity was determined in accordance with DIN 53596. The Mooney values were determined in accordance with ASTM D 1646–67; the hardness was determined in accordance with ASTM D 2240–64 T; the modulus, tensile strength and elongation at break were determined in accordance with ASTM D 412–66; the tear resistance was determined in accordance with NEN 5603; the rebound resilience was determined by means of the Dunlop Tripsometer in accordance with B.S. 903A8-A; the abrasion resistance was determined by means of the Akron abrasion resistance meter in accordance with B.S. 903A9-C; and the heat-build-up and permanent set were determined by means of the Goodrich Flexometer at a temperature of 100° C., a load of 24 lbs. and a stroke of 0.175 inch in accordance with ASTM 623-62A. The extrusion properties were determined with a "Troester" extrusion machine (type HL St. 30) at a screw speed of 30 r.p.m. and an extrusion opening of 5 mm. The results of such measurements are given in Table B.

TABLE B

| Mix | (a) | (b) | (c) | (d) | (e) |
|---|---|---|---|---|---|
| Specific gravity, g./ml | 1.132 | 1.133 | 1.134 | 1.135 | 1.136 |
| Mooney viscosity, ML (1+4) 100° C | 60 | 70 | 66 | 66 | 91 |
| Mooney scorch ML-1 (Δ=10), 145° C, min | 6.6 | 5.8 | 6.2 | 6.2 | 5.1 |
| Hardness, °Shore A | 59 | 62 | 61 | 60 | 65 |
| Modulus 300%, kg./cm.$^2$ | 114 | 137 | 128 | 119 | 142 |
| Tensile strength, kg./cm.$^2$ | 263 | 259 | 261 | 263 | 237 |
| Elongation at break, percent | 530 | 505 | 515 | 530 | 475 |
| Tear resistance (Delft), kg./cm.$^2$ | 133 | 129 | 83 | 122 | 137 |
| Rebound, percent | 64.7 | 57.5 | 63.4 | 62.2 | 50.0 |
| Abrasion, cm.$^3$/10$^6$ rev | 466 | 360 | 478 | 437 | 294 |
| Heat build-up, ° C | 11.4 | 14.1 | 10.6 | 11.0 | 22.1 |
| Permanent set | 3.8 | 2.6 | 3.2 | 4.1 | 10.0 |
| Volume resistivity, ohm. cm | 3.5.10$^8$ | 260 | 5.5.10$^5$ | 4.6.10$^4$ | 50 |
| Extrusion speed, cm./min | 166 | 169 | 166 | 164 | 190 |
| Extrusion swelling (direct), percent | 97 | 88 | 103 | 111 | 78 |
| Extrusion swelling (after 24 hours), percent | 100 | 90 | 106 | 114 | 79 |
| Extrusion capacity, ml./min | 64.2 | 62.3 | 66.2 | 68.0 | 66.2 |

It is quite clear from the above results that the mixes (b) and (e) according to the invention are significantly better than the other mixes (a), (c) and (d) in respect of conductivity, extrusion characteristics and abrasion.

EXAMPLE II

Four natural rubber mixes (f), (g), (h) and (i), the compositions of which are indicated in parts, by weight, in Table C, were prepared in a similar manner to Example I. In this case, 5 parts, by weight, of a plasticiser (Dutrex-55, a Shell product) were also incorporated in each of the mixes. In mix (g) according to the invention, the gasification carbon was mixed with equal parts by weight of the plasticizer before being mixed into the rubber mix. The resulting carbon/plasticiser mix was capable of being incorporated rapidly and uniformly into the rubber mix.

The extrusion properties and the Mooney values were determined prior to vulcanizing of the mixtures. The other properties were determined after vulcanisation for 30 minutes at 145° C. The results of such determinations are also given in Table C below.

TABLE C

| Mix | (f) | (g) | (h) | (i) |
|---|---|---|---|---|
| NR-SS No. 1 | 100 | 100 | 100 | 100 |
| ZnO | 5 | 5 | 5 | 5 |
| Stearic acid | 3 | 3 | 3 | 3 |
| KETJENBLACK SRF-WP | 50 | 45 | 45 | 45 |
| Gasification carbon | | 5 | | |
| Acetylene black | | | 5 | |
| Vulcan XC 72 | | | | 5 |
| DUTREX-55 | 5 | 5 | 5 | 5 |
| MBTS | 0.6 | 0.6 | 0.6 | 0.6 |
| Sulphur | 2.5 | 2.5 | 2.5 | 2.5 |
| Specific gravity, g./ml | 1.129 | 1.126 | 1.127 | 1.126 |
| Mooney viscosity, ML(1+4), 100° C | 56 | 64 | 57 | 57 |
| Mooney scorch, ML(Δ=10), 145° C, min | 7.2 | 5.6 | 7.4 | 7.1 |
| Hardness,° Shore A | 57 | 60 | 58 | 57 |
| Modulus 300%, kg./cm.$^2$ | 103 | 119 | 107 | 108 |
| Tensile strength, kg./cm.$^2$ | 261 | 234 | 247 | 241 |
| Elongation at break, percent | 555 | 510 | 540 | 535 |
| Tear strength (Delft), kg./cm.$^2$ | 127 | 128 | 136 | 134 |
| Rebound, percent | 64.2 | 59.4 | 64.2 | 64.6 |
| Abrasion, cm.$^3$/10$^6$ rev | 435 | 342 | 428 | 414 |
| Heat build-up, ° C | 10.4 | 13.1 | 13.0 | 11.2 |
| Permanent set percent | 3.9 | 4.1 | 5.3 | 4.7 |
| Extrusion, cm./min | 154 | 160 | 148 | 155 |
| Extrusion swelling (direct), percent | 126 | 113 | 134 | 120 |
| Extrusion swelling (after 24 hours), percent | 131 | 115 | 139 | 124 |
| Extrusion capacity, ml./min | 68.2 | 66.9 | 67.9 | 66.9 |
| Volume resistivity, ohm. cm | 4.1-10$^5$ | 50 | 2.2-10$^5$ | 5.0-10$^5$ |

The results above clearly show the surprisingly good conductivity and the improved extrusion properties of the mix (g) according to the invention as compared to the corresponding properties of the mixes (f), (h) and (i) which do not contain any gasification carbon.

EXAMPLE III

Seven styrene butadiene rubber based mixes (j) to (p) were prepared in a similar way to Example I. The compositions of the mixes, in parts, by weight, are given in Table D. The mixes were vulcanised at 150° C. for 60 minutes. The various properties of the unvulcanised and of the vulcanized mix were measured as before and the results are also given in Table D.

TABLE D

| Mix | (j) | (k) | (l) | (m) | (n) | (o) | (p) |
|---|---|---|---|---|---|---|---|
| SBR 1502 | 100 | 100 | 100 | 100 | 100 | 100 | 100 |
| ZnO | 3 | 3 | 3 | 3 | 3 | 3 | 3 |
| Stearic acid | 1 | 1 | 1 | 1 | 1 | 1 | 1 |
| Santocure NS | 1 | 1 | 1 | 1 | 1 | 1 | 1 |
| Sulphur | 1.75 | 1.75 | 1.75 | 1.75 | 1.75 | 1.75 | 1.70 |
| KETJENBLACK SRF-WP | 50 | 45 | 45 | 45 | 40 | 30 | 3$^4$ |
| Gasification carbon | | 5 | | | 10 | | |
| Acetylene black | | | 5 | | | 20 | |
| Vulcan XC 72 | | | | 5 | | | 20 |
| Specific gravity, g./ml | 1.146 | 1.151 | 1.153 | 1.149 | 1.155 | 1.152 | 1.152 |
| Mooney viscosity, ML(1+4) 100° C | 66 | 81 | 75 | 73 | 105 | 76 | 83 |
| Mooney scorch, ML-1 (Δ=10), 145° C, min | 13.7 | 10.9 | 14.0 | 14.3 | 11.1 | 15.5 | 16.1 |
| Hardness, ° Shore A | 63 | 66 | 64 | 65 | 70 | 67 | 66 |
| Modulus 300%, kg./cm.$^2$ | 154 | 189 | 159 | 160 | 223 | 176 | 177 |
| Tensile strength, kg./cm.$^2$ | 255 | 250 | 245 | 249 | 256 | 232 | 258 |
| Elongation at break, percent | 465 | 400 | 445 | 430 | 350 | 410 | 440 |
| Tear resistance (Delft), kg./cm.$^3$ | 43 | 48 | 46 | 42 | 48 | 48 | 45 |
| Rebound, percent | 58.3 | 52.4 | 58.6 | 56.9 | 44.7 | 56.5 | 52.3 |
| Abrasion, cm.$^3$/10$^6$ rev | 196 | 152 | 188 | 190 | 150 | 192 | 156 |
| Heat build-up, ° C | 19.7 | 25.2 | 20.8 | 19.5 | 29.6 | 21.4 | 24.5 |
| Permanent set, percent | 2.2 | 2.4 | 2.0 | 1.8 | 2.9 | 2.2 | 2.4 |
| Volume resistivity, ohm. cm | >10$^{12}$ | 3.2.10$^3$ | 5.3.10$^{10}$ | 3.2.10$^{10}$ | 110 | 2.0.10$^6$ | 2.4.10$^4$ |
| Extrusion speed, cm./min | 109 | 130 | 119 | 120 | 145 | 139 | 142 |
| Extrusion swelling (direct), percent | 141 | 118 | 134 | 133 | 93 | 101 | 105 |
| Extrusion swelling (after 24 hours), percent | 162 | 126 | 151 | 148 | 95 | 108 | 111 |
| Extrusion capacity, ml./min | 51.8 | 55.6 | 54.5 | 54.8 | 54.9 | 54.8 | 57.1 |

NOTE.—CARIFLEX SBR-1502 is a commercially available styrene butadiene rubber produced by the Shell Co. Santocure NS is a commercially available accelerator made by Monsanto.

It will be apparent from the above that, also in the case of elastomeric compounds based on styrene butadiene rubber, the mixes (k) and (n) according to the invention are superior to the other mixes in respect of conductivity, extrusion properties and abrasion. Comparison of the other properties shows that the mixes according to the invention are generally somewhat stiffer than the other mixes, stiffness increasing with the gasification carbon content. If the modulus is considered in connection with the other properties, this somewhat increased stiffness of the compounds according to the invention, particularly in the case of the compound having the lower gasification carbon content, is of no disadvantage for practically all uses for which the other mixtures are suitable in view of their mechanical properties.

EXAMPLE IV

Example III was repeated in respect of the mixes (j), (k), (l) and (m) thereof, except that 5 parts by weight of plasticiser (DUTREX-55) were also added per 100 parts by weight of the styrene butadiene rubber (SBR-1502) in each mix. In the case of mix (k), the gasification carbon was mixed with the plasticiser prior to admixture with the other constituents.

EXAMPLE V

Eight styrene butadiene rubber mixes (q) to (x) were prepared by a mixing process similar to that described in Example I, with the compositions, in parts by weight, being indicated in Table F. The MBTS, DPG (diphenylguanidine) and sulphur were mixed on an open mixing roll. Antioxidant MB is a commercial product made by Bayer; KETJENWHITE SI 200 is a reinforcing silica filler made by Koninklijke Zwavelzuurfabrieken voorheen Ketjen N.V.; and INTOL SBR-1509 is a commercially available styrene butadiene rubber produced by International Rubber Co.

In mixes (r) to (x) of this example, the electrically conductive black was added without reducing the amount of non-conductive filler (silica) proportionately.

In the preparation of mixes (r), (s) and (t), the gasification carbon was again added after being mixed with equal parts by weight of plasticiser (Dutrex-55), in order to obtain compounds having approximately the same hardness as those of the mixes (u) to (x). The compounds were vulcanised at 150° C. for 45 minutes. The various properties of the unvulcanised and vulcanised compounds are also given in Table F. The abrasion in this case was

TABLE F

| Mix | (q) | (r) | (s) | (t) | (u) | (v) | (w) | (x) |
|---|---|---|---|---|---|---|---|---|
| INTOL SBR-1509 | 100 | 100 | 100 | 100 | 100 | 100 | 100 | 102 |
| ZnO (active) | 2 | 2 | 2 | 2 | 2 | 2 | 2 | 2 |
| Stearic acid | 2 | 2 | 2 | 2 | 2 | 2 | 2 | 2 |
| Antioxidant MB | 1 | 1 | 1 | 1 | 1 | 1 | 1 | 1 |
| Diethylene glycol | 3 | 3 | 3 | 3 | 3 | 3 | 3 | 3 |
| Triethanolamine | 0.5 | 0.5 | 0.5 | 0.5 | 0.5 | 0.5 | 0.5 | 0.5 |
| KETJENWHITE SI 200 | 50 | 50 | 50 | 50 | 50 | 50 | 50 | 50 |
| MBTS | 0.8 | 0.8 | 0.8 | 0.8 | 0.8 | 0.8 | 0.8 | 0.8 |
| DPG | 1.2 | 1.2 | 1.2 | 1.2 | 1.2 | 1.2 | 1.2 | 1.2 |
| Sulphur | 2.5 | 2.5 | 2.5 | 2.5 | 2.5 | 2.5 | 2.5 | 2.5 |
| Gasification carbon | | 10 | 12.5 | 15 | | | | |
| Acetylene black | | | | | 10 | 20 | | |
| Vulcan XC 72 | | | | | | | 10 | 20 |
| Specific gravity, g./ml | 1,174 | 1,191 | 1,188 | 1,193 | 1,201 | 1,232 | 1,202 | 1,229 |
| Mooney viscosity, ML (1+4), 125° C | 85 | 135 | 142 | 170 | 106 | 127 | 113 | 136 |
| Mooney Scorch, ML-1 ($\Delta$=10), 125° C., min | 10.4 | 10.3 | 9.7 | 10.1 | 9.6 | 9.3 | 10.7 | 11.7 |
| Hardness, ° Shore A | 71 | 77 | 78 | 80 | 76 | 78 | 77 | 81 |
| Modulus, 300%, kg./cm.$^2$ | 36 | 58 | 67 | 74 | 58 | 92 | 59 | 89 |
| Tensile strength, kg./cm.$^2$ | 223 | 227 | 227 | 213 | 230 | 233 | 232 | 220 |
| Elongation at break, percent | 645 | 645 | 630 | 590 | 605 | 545 | 600 | 550 |
| Tear resistance (Delft), kg./cm.$^2$ | 57 | 62 | 61 | 64 | 55 | 54 | 57 | 54 |
| Rebound, percent | 37.3 | 30.0 | 29.4 | 27.1 | 37.2 | 34.6 | 34.8 | 33.3 |
| Abrasion DVM, mm.$^3$ | 179 | 169 | 167 | 166 | 166 | 166 | 170 | 160 |
| Volume sensitivity, ohm. cm | 4.2.10$^9$ | 5.3.10$^5$ | 370 | 120 | 2.7.10$^9$ | 8.3.10$^9$ | 4.9.10$^9$ | 9.8.10$^9$ |
| Extrusion speed, cm./min | 106 | n.d. | n.d. | 129 | n.d. | n.d. | n.d. | 111 |
| Extrusion swelling (direct), percent | 120 | n.d. | n.d. | 43 | n.d. | n.d. | n.d. | 72 |
| Extrusion swelling (after 24 hours), percent | 120 | n.d. | n.d. | 43 | n.d. | n.d. | n.d. | 72 |
| Extrusion capacity, ml./min | 45.7 | n.d. | n.d. | 36.2 | n.d. | n.d. | n.d. | 37.5 |

NOTE.—n.d.=Not determined.

The properties of the resulting mixes, as determined in the previously described manner, are given in Table E.

TABLE E

| Mix | (j) | (k) | (l) | (m) |
|---|---|---|---|---|
| Specific gravity, g./ml | 1.144 | 1.147 | 1.148 | 1.148 |
| Mooney viscosity, ML(1+4), 100° C | 67 | 73 | 63 | 68 |
| Mooney scorch, ML-1($\Delta$=10), 150° C., min | 15.5 | 13.2 | 12.6 | 13.0 |
| Hardness, ° Shore A | 61 | 64 | 62 | 61 |
| Modulus 300%, kg./cm.$^2$ | 120 | 149 | 117 | 113 |
| Tensile strength, kg./cm.$^2$ | 208 | 231 | 223 | 219 |
| Elongation at break, percent | 470 | 470 | 510 | 510 |
| Tear resistance (Delft), kg./cm.$^2$ | 50 | 50 | 45 | 50 |
| Rebound, percent | 59.5 | 52.9 | 58.4 | 56.6 |
| Abrasion, cm.$^3$/10$^6$ rev | 270 | 200 | 271 | 221 |
| Heat build-up, ° C | 19.4 | 23.2 | 19.7 | 22.5 |
| Permanent set, percent | 2.7 | 3.0 | 2.9 | 2.7 |
| Volume resistivity, ohm.cm | >10$^{12}$ | 5.0.10$^3$ | >10$^{12}$ | 3.7.10$^{11}$ |
| Extrusion speed, cm./min | 111 | 142 | 126 | 127 |
| Extrusion swelling (direct), percent | 142 | 110 | 134 | 133 |
| Extrusion swelling (after 24 hours), percent | 165 | 117 | 154 | 150 |
| Extrusion capacity, ml./min | 52.7 | 58.4 | 57.9 | 57.8 | determined in accordance with DIN 53516 (Abrasion DVM).

From the above results it will be seen that the mixes (r), (s) and (t) according to the invention had better extrusion properties and much better conductivity than the other compounds.

EXAMPLE VI

Example V was repeated with respect to mixes (q), (r), (s), (t), (u) and (v), except that the nonconductive filler used was 100 parts by weight of a clay (Franclay A, a commercial product made by Franterre) instead of 50 parts by weight of silica, and no triethanol amine was added.

The properties of these six mixes (q'), (r'), (s'), (t'), (u') and (v') are given in Table G.

TABLE G

| Mix | (q') | (r') | (s') | (t') | (u') | (v') |
|---|---|---|---|---|---|---|
| Specific gravity, g./ml. | 1.387 | 1.374 | 1.380 | 1.379 | 1.419 | 1.420 |
| Mooney viscosity, ML (1+4), 125° C | 36 | 48 | 54 | 60 | 55 | 57 |
| Mooney scorch, ML-1 (Δ=10), 125° C., min | 8.0 | 8.5 | 8.4 | 8.7 | 6.9 | 8.6 |
| Hardness, ° Shore A | 67 | 70 | 71 | 73 | 75 | 75 |
| Modulus 300%, kg./cm.² | 30 | 50 | 55 | 60 | 69 | 75 |
| Tensile strength, kg./cm.² | 150 | 166 | 160 | 157 | 146 | 153 |
| Elongation at break, percent | 615 | 620 | 605 | 590 | 500 | 495 |
| Tear resistance (DELFT), kg./cm.³ | 28 | 34 | 37 | 39 | 42 | 39 |
| Rebound, percent | 46.7 | 34.4 | 31.8 | 29.9 | 37.4 | 36.4 |
| Abrasion DVM, mm.³ | 438 | 416 | 422 | 424 | 391 | 401 |
| Volume resistivity, ohm. cm | >10¹² | 330 | 70 | 40 | >10¹² | >10¹² |
| Extrusion speed, cm./min | 122 | n.d. | n.d. | 179 | n.d. | 155 |
| Extrusion swelling (direct) percent | 125 | n.d. | n.d. | 52 | n.d. | 62 |
| Extrusion swelling (after 24 hours), percent | 128 | n.d. | n.d. | 52 | n.d. | 64 |
| Extrusion capacity, ml./min | 53.8 | n.d. | n.d. | 53.5 | n.d. | 49.3 |

NOTE.—n.d.=Not determined.

EXAMPLE VII

Two neoprene rubber based mixes (y) and (z) were prepared. The compositions in parts, by weight, are given in Table H. The ingredients were mixed in a Banbury mixer except for the ZnO and accelerator, which constituents were mixed on an open mixing roll. The mixes were vulcanised at 150° C. for 45 minutes. The properties of the mixes determined before and after vulcanisation are also given in Table H. In the below table, Neoprene W is a commercially available polychloroprene rubber made by Du Pont, and Na-22 is a commercially available accelerator made by Du Pont.

TABLE H

| Mix | (y) | (z) |
|---|---|---|
| Neoprene W | 100 | 100 |
| ZnO | 5 | 5 |
| MgO | 4 | 4 |
| Stearic acid | 0.5 | 0.5 |
| Phenyl-2-naphthylamine | 2 | 2 |
| KETJENBLACK SRF-P | 50 | 45 |
| Gasification carbon | — | 5 |
| Dutrex 55 | 10 | 10 |
| Tetramethyl thiurammonosulphide | 0.5 | 0.5 |
| Na-22 | 0.5 | 0.5 |
| Mooney viscosity ML (1-4), 125° C | 43 | 70 |
| Mooney scorch ML-1 (Δ=10), 125° C., min | 9.1 | 7.2 |
| Hardness, ° Shore A | 65 | 71 |
| Modulus 200%, kg./cm.² | 105 | 142 |
| Tensile strength, kg./cm.² | 212 | 216 |
| Elongation at break, percent | 375 | 300 |
| Tear resistance (Delft), kg./cm.³ | 52 | 49 |
| Rebound, percent | 53.7 | 45.2 |
| Heat build-up, ° C | 22.3 | 27.5 |
| Permanent set, percent | 2.1 | 1.2 |
| Volume resistivity, ohm. cm | 1.8.10¹⁰ | 690 |
| Extrusion speed, cm./min | 130 | 145 |
| Extrusion swelling (direct), percent | 106 | 75 |
| Extrusion swelling (after 24 hours), percent | 115 | 79 |
| Extrusion capacity, ml./min | 52.5 | 49.6 |

From the above table it will be apparent that the volume resistivity of neoprene rubber is also greatly reduced if 5 parts of the 50 parts of non-conductive black are replaced by 5 parts of gasification carbon per 100 parts by weight of neoprene rubber.

What is claimed is:

1. Elastomeric mixture vulcanizable to an electrically conductive vulcanisate having improved extrusion characteristics and abrasion resistance and consisting essentially of 100 parts, by weight, of elastomer, approximately 40 to 400 parts, by weight, of non-conductive filler, and approximately 2 to 15 parts, by weight, of gasification carbon.

2. Elastomeric mixture according to claim 1, further containing a vulcanizing agent.

3. Elastomeric mixture according to claim 1, further containing an accelerator.

4. Elastomeric mixture according to claim 1, further containing an antioxidant.

5. Elastomeric mixture according to claim 1, further containing a plasticiser.

6. Elastomeric mixture according to claim 1, in which said non-conductive filler is a reinforcing filler.

7. Elastomeric mixture according to claim 6, in which said reinforcing filler is carbon black.

8. Elastomeric mixture according to claim 6, in which said reinforcing filler is silica.

9. Elastomeric mixture according to claim 1, in which said non-conductive filler is a non-reinforcing filler.

10. Elastomeric mixture according to claim 9, in which said non-reinforcing filler is clay.

11. Elastomeric mixture according to claim 1, in which said gasification carbon is in granular form.

12. Elastomeric mixture according to claim 1, in which said gasification carbon has a sufficiently small metal content to avoid any harmful effect therefrom on the vulcanisate resulting when said mixture is vulcanized.

13. Elastomeric mixture according to claim 1, in which said gasification carbon has a surface, determined by the BET method, of 300 to 1500 m.²/g., a micropore volume, determined by the $N_2$ method, of 1.0 to 3.0 ml./g., a macropore volume, determined by a Hg-porosimeter, of 2.0 to 4.0 ml./g., an oil absorption of 2.5 to 5.5 ml./g., a volatile substance content of 0.1 to 6.0% by weight, and an ash content of 0.5 to 10.0% by weight.

14. A method of rendering electrically conductive the vulcanisate resulting from vulcanizing of an elastomeric mixture consisting essentially of an elastomer and, for each 100 parts, by weight, of said elastomer, approximately 40 to 400 parts, by weight, of non-conductive filler; comprising mixing with said elastomer and non-conductive filler, prior to vulcanizing, approximately 2 to 15 parts, by weight, of gasification carbon for each 100 parts, by weight, of said elastomer so that the resulting vulcanisate will have improved extrusion characteristics and abrasion resistance.

15. The method according to claim 14, in which said gasification carbon has a surface, determined by the BET method, of 300 to 1500 m.²/g., a micropore volume, determined by the $N_2$ method, of 1.0 to 3.0 ml./g., a macropore volume, determined by a Hg-porosimeter, of 2.0 to 4.0 ml./g., an oil absorption of 2.5 to 5.5 ml./g., a volatile substance content of 0.1 to 6.0% by weight, and an ash content of 0.5 to 10.0% by weight.

16. The method according to claim 14, in which said gasification carbon is premixed with said non-conductive filler and the resulting premix is then mixed with said elastomer.

17. The method according to claim 14, in which said gasification carbon is premixed with a plasticiser and the resulting premix is then mixed with said elastomer and non-conductve filler.

18. The method according to claim 17, in which the proportion of said plasticiser to said gasification carbon is 1:1, by weight.

19. The method according to claim 14, in which said gasification carbon is in granular form.

20. The method according to claim 14, in which, prior to being mixed with said elastomer and non-conductive filler, the metal content of said gasification carbon is sufficiently reduced to avoid any harmful effect therefrom on the vulcanisate.

References Cited

UNITED STATES PATENTS

| | | | |
|---|---|---|---|
| 3,104,985 | 9/1963 | Williams et al. | 252—511 |
| 3,056,750 | 10/1962 | Pass | 252—511 |
| 3,364,156 | 1/1968 | Kraus | 23—209.2 |

DOUGLAS J. DRUMMOND, Primary Examiner

U.S. Cl. X.R.

23—209.2; 106—307; 260—41.5 R, 763